(12) United States Patent
Honda

(10) Patent No.: US 6,377,307 B1
(45) Date of Patent: Apr. 23, 2002

(54) LINE INTERPOLATION APPARATUS AND VIDEO SIGNAL CONVERSION DEVICE

(75) Inventor: Hirofumi Honda, Yamanashi (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/577,076

(22) Filed: May 23, 2000

(30) Foreign Application Priority Data

May 27, 1999 (JP) .......................................... 11-148610
May 27, 1999 (JP) .......................................... 11-148611

(51) Int. Cl.[7] .......................... H04N 7/01; H04N 11/20
(52) U.S. Cl. ..................................... 348/448; 348/458
(58) Field of Search ................................. 348/448, 449, 348/450, 451, 452, 458, 445, 441, 443; H04N 11/20, 7/01

(56) References Cited

U.S. PATENT DOCUMENTS

| | | | | |
|---|---|---|---|---|
| 4,985,764 A | * | 1/1991 | Sato ............................ | 348/448 |
| 5,093,721 A | * | 3/1992 | Rabii .......................... | 348/441 |
| 5,579,053 A | * | 11/1996 | Pandel ........................ | 348/448 |
| 5,886,745 A | * | 3/1999 | Muraji et al. ................ | 348/448 |
| 5,936,676 A | * | 8/1999 | Ledinh et al. ............... | 348/452 |
| 6,133,957 A | * | 10/2000 | Campbell .................... | 348/458 |

\* cited by examiner

*Primary Examiner*—Michael Lee
(74) *Attorney, Agent, or Firm*—Sughrue Mion, PLLC

(57) ABSTRACT

For an upper real scan signal that is above and adjacent to an interpolation scan line, a lower interpolation element Sd is generated based on the upper real scan signal and a plurality of real scan signals that are vertically continuous. For a lower real scan signal that is below and adjacent to an interpolation scan line, an upper interpolation element Su is generated based on the lower real scan signal and a plurality of real scan signals that are vertically continuous. Inclination information CNT for an image is detected based on at least two real scan signals, including the upper and lower real scan signals. The levels of the upper interpolation element Su and the lower interpolation element Sd are adjusted in accordance with the inclination information CNT, and the obtained first interpolation element and second interpolation element are added together. As a result, an interpolation scan signal is generated that can be inserted into the interpolation scan line that is adjacent to the upper and the lower real scan lines.

4 Claims, 14 Drawing Sheets

VERTICAL DIRECTION ←

VERTICAL DIRECTION ←

→ VERTICAL DIRECTION

→ VERTICAL DIRECTION

LINE INTERPOLATION APPARATUS AND VIDEO SIGNAL CONVERSION DEVICE

BACKGROUND OF THE INVENTION

1. Field of the Invention

The present invention relates to a line interpolation apparatus, and relates in particular to a line interpolation apparatus that converts an interlaced video scan signal, such as an NTSC television signal or a PAL television signal, into a progressive video scan signal.

The present invention also relates to a video signal conversion device for performing a video signal conversion to obtain a video signal that has a higher resolution.

2. Description of the Related Art

For conventional use, plasma display devices (PDPs), liquid crystal display devices (LCDs) and electroluminescence display devices (ELs), which can reproduce images at high resolutions, have become popular.

In the process for converting an interlaced video scan signal into a progressive video scan signal, since every other scan signal is an intermittent signal obtained by interlaced scanning performed in the field of an interlaced video scan signal, the intermittent portion should be interpolated by using an interpolated scan signal.

For this interpolated scan signal, a well known, so-called average value interpolation method is used. According to this method, for a static image an inter-field process is performed, and, for example, parallel to the time axis, the average value of pixel signals in adjacent fields along corresponding scan lines is inserted as an interpolated scan signal. For a moving image, an intra-field process is performed, and, for example, the average value of pixel signals along scan lines that are vertically adjacent in the same field is inserted as an interpolated signal.

More specifically, as shown in FIG. 15, when interpolated gray level scan signals $y_{12}$ to $y_{56}$ (designated by ●s) are to be generated based on real scan signals (designated by ○s) for individual gray level pixels $X_1$ to $X_6$, first, an upper interpolation element (designated by a △) and a lower interpolation element (designated by a □) are generated that have gray levels of 1/2 of those of the individual real scan signals. Then, adjacent upper interpolation elements are individually paired with lower interpolation elements and are added together, and interpolated gray level scan signals $y_{12}$ to $y_{56}$ are generated and inserted between the real scan signals.

For example, to generate an interpolated scan signal $y_{23}$ that is to be inserted between real scan signals $X_2$ and $X_3$, a lower interpolation element $X_2/2$, which is designated by a □ and which is calculated using the real scan signal $X_3$, and an upper interpolation element $X_3/2$, which is designated by a △ and which is calculated using a real scan signal $X_3$, are added together, i.e., the calculation $(X_2/2)+(X_3/2)$ is performed.

However, when the conventional average value interpolated method is used, it is difficult to reproduce a peak value that is lost during a process performed to convert a sampled video signal into a digital signal, so that image sharpness is deteriorated and a degraded image quality is obtained.

SUMMARY OF THE INVENTION

To resolve the above shortcoming, it is an objective of the invention to provide a progressive scan conversion apparatus for a video signal that can reproduce the peak value of a video signal that is lost during digital sampling, and that can effectively obtain a preferable converted image.

It is also an objective of the invention to provide a video signal conversion device that can reproduce the peak value of a video signal that is lost during digital sampling, and that can effectively provide a preferable converted image.

To achieve the above objects, according to an aspect of the invention, there is provided a line interpolation apparatus for converting a video signal for interlaced scanning into a video signal for progressive scanning, which comprises:

lower interpolated element generation means for employing an upper real scan signal, along a real scan line that is above and adjacent to an interpolated scan line, and real scan signals, along a plurality of sequential real scan lines that are vertical relative to the upper real scan line, to generate a lower interpolation element for the upper real scan signal;

upper interpolation element generation means for employing a lower real scan signal, along a lower real scan line that is below and adjacent to the interpolated scan line, and real scan signals, along a plurality of sequential real scan lines that are vertical to the lower real scan line, to generate an upper interpolation element for the lower real scan signal;

inclination detection means for detecting inclination information for an image based on two or more real scan signals, including the upper and the lower real scan signals;

limitation means for adjusting the levels of the upper interpolation element and the lower interpolation element in accordance with the inclination information detected by the inclination detection means, and for generating a first interpolation element and a second interpolation element whose levels are adjusted; and addition means for adding the first and the second interpolation elements to generate an interpolated scan signal that is to be inserted into the interpolated scan lines that are adjacent to the upper and the lower real scan lines.

In the thus arranged line interpolated apparatus, the lower interpolation element means employs the upper real scan signal (a real scan signal along a real scan line above and adjacent to the interpolated scan line) and real scan signals that are located along a plurality of sequential real scan lines, which are vertical relative to the upper real scan line, to generate the lower interpolation element of the upper real scan signal. And the upper interpolation element means employs the lower real scan signal (a real scan signal along a real scan line below and adjacent to the interpolated scan line) and real scan signals that are located along a plurality of sequential real scan lines, which are vertical relative to the upper real scan line, to generate the upper interpolation element of the lower real scan signal.

The inclination detection means detects inclination information for an image based on two or more real scan signals, including the upper real scan signal and the lower real scan signal. Then, in accordance with the inclination information (the detected information), the limitation means adjusts the levels of the lower and upper interpolation elements to generate the first and the second interpolation elements.

The addition means adds together the first and the second interpolation elements to generate an interpolated scan signal, which it inserts into the interpolated scan line.

According to another aspect of the invention, there is provided a video signal conversion device, which comprises:

first interpolation element generation means for employing pixel data for a first pixel, which is vertically (or horizontally) adjacent to one side of an interpolation pixel, and pixel data for a plurality of pixels, which are vertically (or horizontally) contiguous with the first pixel, to generate an interpolation element for the first pixel positioned beside the interpolation pixel;

second interpolation element generation means for employing pixel data for a second pixel, which is vertically (or horizontally) adjacent to the other side of the interpolation pixel, and pixel data for a plurality of pixels, which are vertically (or horizontally) contiguous with the second pixel, to generate an interpolation element for the second pixel positioned beside the interpolation pixel;

addition means for adding together the first interpolation element and the second interpolation element to generate interpolation pixel data for the interpolation pixel; and compensation means for generating a compensation value based on the pixel data for the first or Lhe second pixel and the pixel data for the plurality of pixels that are vertically (or horizontally) contiguous with the relevant pixel, and for mixing the compensation value with the pixel data for the first or the second pixel.

With this arrangement, the first interpolation element generation means employs pixel data for the first pixel, which is positioned adjacent to one side of the interpolation pixel, and pixel data for a plurality of pixels that are vertically (or horizontally) contiguous with the first pixel to generate an interpolation element for the first pixel adjacent to the interpolation pixel. The second interpolation element generation means employs pixel data for the second pixel, which is positioned adjacent to the other side of the interpolation pixel, and pixel data for a plurality of pixels that are vertically (or horizontally) contiguous with the second pixel to generate an interpolation element for the second pixel adjacent to the interpolation pixel.

The addition means adds the interpolation elements for the first and the second pixels that are positioned adjacent to the sides of the interpolation pixel, and generates interpolation pixel data for the interpolation pixel.

The compensation means generates a compensation value using the pixel data for the first or the second pixel and the pixel data for the plurality of pixels that are vertically (or horizontally) contiguous with the relevant pixel. Then, to generate pixel data for the first or second pixel, the compensation means mixes the compensation value with the pixel data for the relevant pixel.

DETAILED DESCRIPTION OF THE PRESENT INVENTION

The present invention will be described in detail with reference to the accompanying drawings.

First Embodiment

Figure 1:
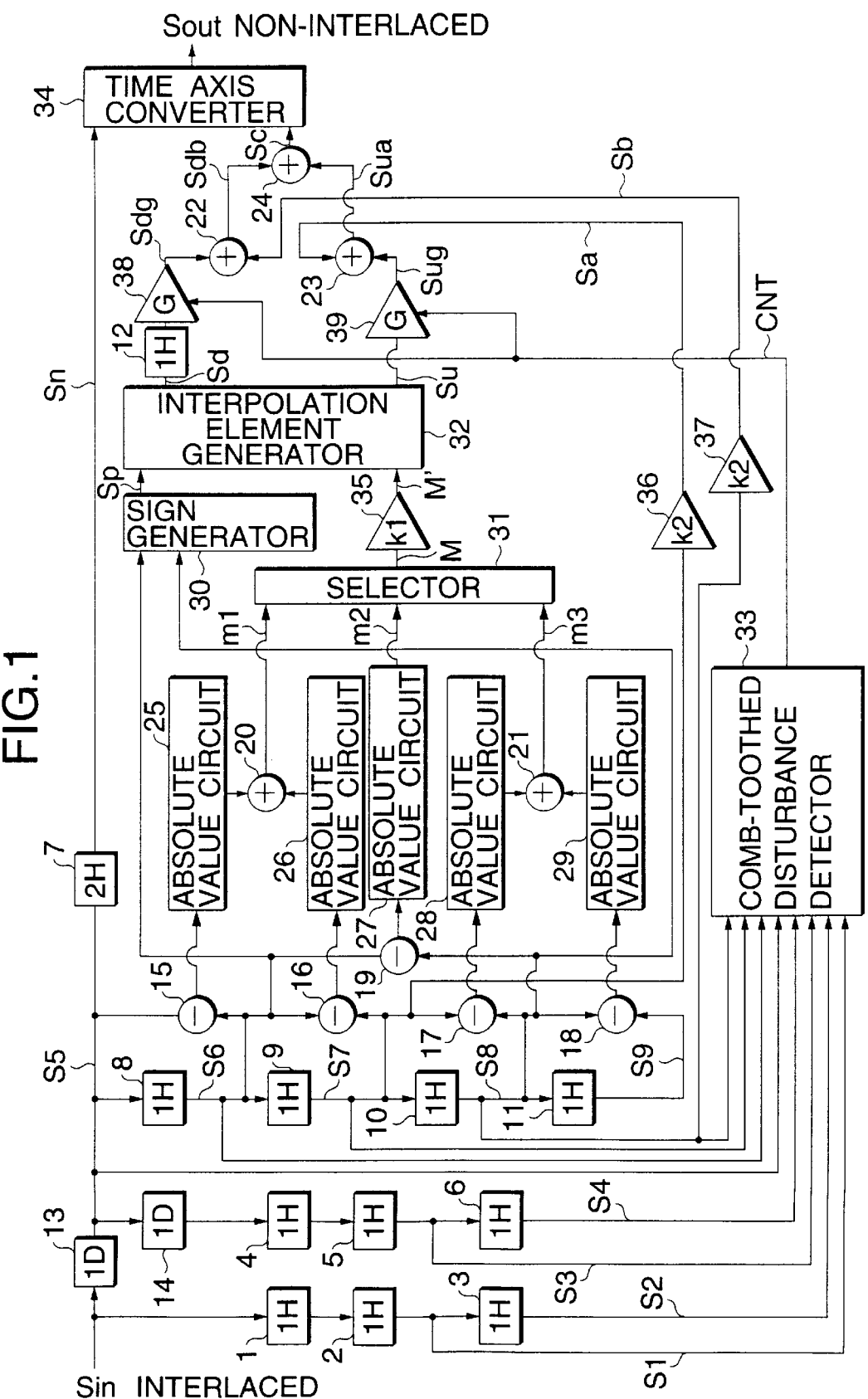
FIG. 1 is a block diagram illustrating the arrangement of a line interpolation apparatus according to a first embodiment of the invention.

A first embodiment of the invention will now be described while referring to the drawings. FIG. 1 is a block diagram illustrating the arrangement of a line interpolated apparatus according to this embodiment.

In FIG. 1, the line interpolated apparatus converts an input digital video signal Sin, for interlaced scanning, into a progressive video scan (non-interlaced) signal Sout, which it then outputs. The line interpolated apparatus comprises: a plurality of delay circuits 1 to 14, calculators 15 to 24, absolute value circuits 25 to 29, a sign generator 30, a minimum value selector 31, an interpolation element generator 32, a comb-toothed disturbance detector 33, a time axis converter 34, and coefficient circuits 35 to 39.

For the line interpolated apparatus of this embodiment, a plurality of pairs of the circuits in FIG. 1 are arranged in parallel in order to generate progressive video scan signals for luminance signals Y and color difference signals $P_B$ and $P_R$.

The delay circuits 1 to 6 and 8 to 12 are constituted by an FIFO (First-In First-Out) memory for delaying input signals one horizontal period (a 1H period) and for sequentially outputting the signals. The delay circuit 7 is constituted by an FIFO memory for delaying input signals two horizontal periods (2H periods) and for subsequently, sequentially outputting the signals.

The delay circuits 13 and 14 are constituted by delay elements for delaying input signals a period (hereinafter referred to as a one-dot period) required for scanning one pixel in the horizontal direction (horizontal line direction), and for subsequently, outputting the signals.

The calculators 15 to 19 are subtracters for calculating a difference for two input signals, and for outputting a difference signal. The calculators 20 to 24 are adders for adding together two input signals and for outputting the resultant signal.

The absolute value circuits 25 to 29 calculate the absolute values of input signals, and output absolute value signals.

The sign generator 30 compares the two input signals. When one of the signals is smaller than the other signal, which is defined in advance, a sign signal Sp representing the positive (+) sign is generated and is supplied to the interpolation element generator 32. When one of the signals is equal to or greater than the other signal, a sign signal Sp representing the negative (−) sign is generated and is supplied to the interpolation element generator 32.

The minimum value selector 31 compares signals m1, m2 and m3, which are output by the calculators 20 and 21 and the absolute value circuit 27, and outputs a signal M having a minimum value (hereinafter referred to as a minimum value signal). The coefficient circuit 35 multiplies the minimum value signal M by k1 to adjust its level, and transmits the adjusted minimum value signal M' to the interpolation element generator 32. In this embodiment, the setting for the coefficient k1 is k1=1/4.

Based on the sign signal Sp and the minimum value signal M', the interpolation element generator 32 generates and outputs an upper interpolation element compensated value Su and a lower interpolation element compensated value Sd, both of which will be described later.

The coefficient circuits 38 and 39 perform a leveling adjustment by multiplying, by coefficient G, the lower interpolation element compensated value Sd and the upper interpolation element compensated value Su, each of which are delayed a 1H period by the delay circuit 12. The resultant, first interpolation element compensated value Sdg (=G×Sd) and the second interpolation element compensated value Sug (=G×Su) are then output. The coefficient circuits 38 and 39 are constituted by a variable multiplier for automatically changing the coefficient G in accordance with a signal CNT received from the comb-toothed disturbance detector 33.

The coefficient circuits 36 and 37 perform a leveling adjustment by multiplying, by coefficient k2, real scan signals S7 and S8, which are transmitted for each pixel by the delay circuits 9 and 10. The obtained reference interpolation element values Sa and Sb are then output. In this embodiment, the setting for the coefficient k2 is k2=1/2.

The calculator 22 adds the first interpolation element compensated value Sdg to the reference interpolation element value Sb, and transmits the obtained first interpolation element signal-Sdb to the calculator 24. The calculator 23 adds the second interpolation element value Sug to the reference interpolation element value Sa, and transmits the obtained second interpolation element signal Sua to the calculator 24. The calculator 24 adds together the first and the second interpolation element signals Sdb and Sua, and transmits the resultant value as an interpolated scan signal Sc to the time axis converter 34.

The time axis converter 34 inserts, into each other, the real scan signal Sn and the interpolated scan signal Sc that are transmitted by the delay circuit 7, and generates a progressive video scan signal Sout.

The comb-toothed disturbance detector 33 detects the shape of an image based on the real scan signals S1 to S4 and S6 to S9, which are received from the delay circuits 2, 3, 5, 6, 8 to 11 and 13, and in accordance with the detection results, outputs a detection signal CNT in order to limit excessive interpolation.

Although a detailed explanation will be given for it later, in short, the comb-toothed disturbance detector 33 employs at least two real scan signals, including real scan signals along real scan lines that are adjacent to each other, to detect a pattern having substantially horizontal stripes, the vertical length of which is equivalent to multiple horizontal lines (approximately three horizontal lines), i.e., to detect inclination information for an image (an inclination direction and a distribution for a change in a gray level) The comb-toothed disturbance detector 33 adjusts the coefficient G for the coefficient circuits 38 and 39 by using the detection signal CNT, including the inclination information, and limits the levels (gray levels) of the first interpolation element compensated value Sdg and the second interpolation element compensated value Sug.

When, in the above manner, the upper and lower interpolation element compensated values Sua and Sd are generated, and when the interpolated scan signal Sc that exaggerates the peak or the edge is generated and is converted into a progressive video scan signal, a comb-toothed disturbance occurs, especially along the substantially horizontal stripes what have vertical lengths equivalent to two or three horizontal lines. For such a striped portion, as is described above, the levels of the first and second interpolation element compensated values Sdg and Sug are limited, so that the occurrence of the disturbance can be prevented.

The function and the processing of the thus arranged line interpolation apparatus will now be described while referring to FIGS. 2 to 8B.

Figure 2:
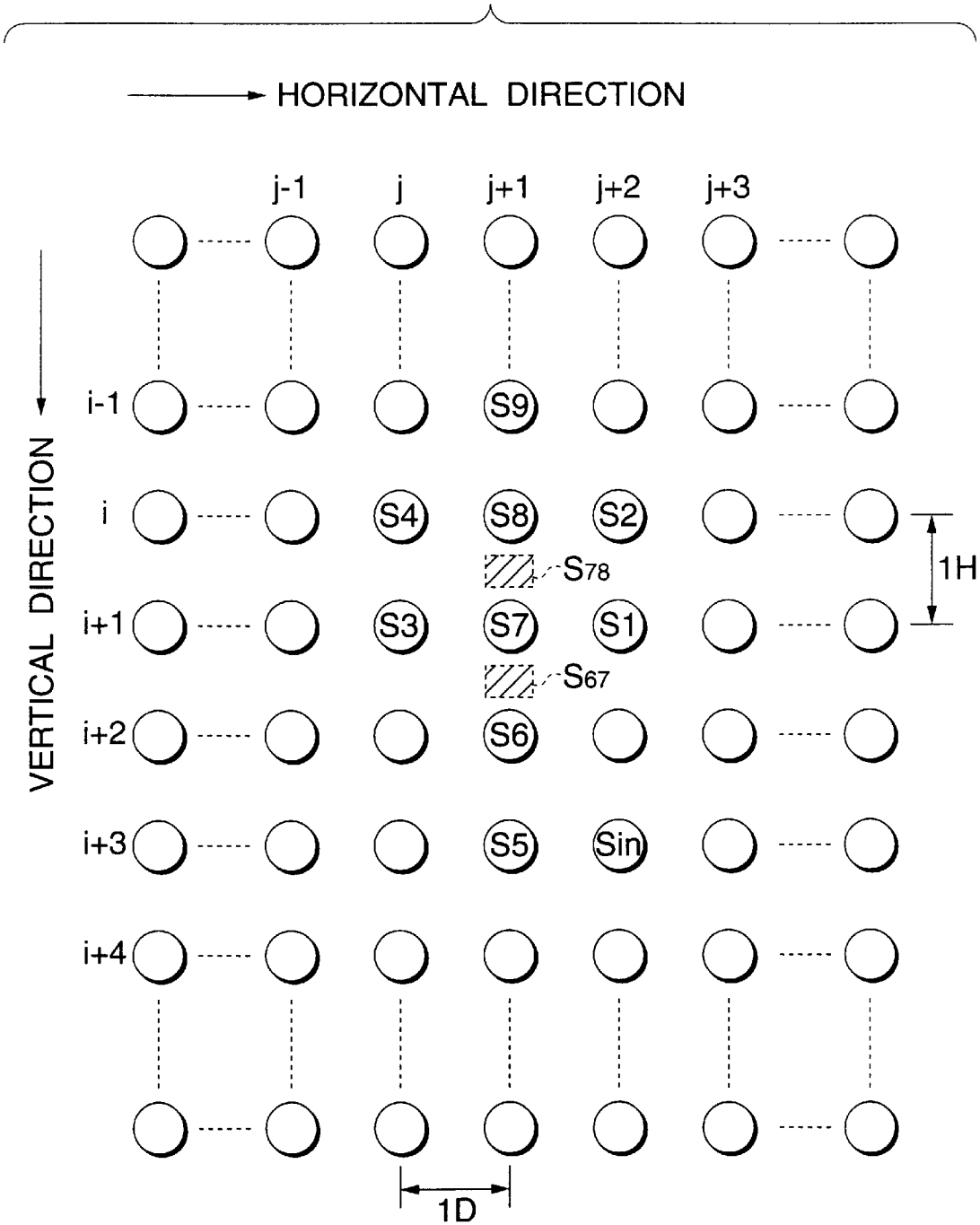
FIG. 2 is a diagram for explaining the spatial arrangement along a time axis of real scan signals and interpolation scan signals.

FIG. 2 is a diagram for explaining an example wherein video signals (real scan signals) in each field are spatially arranged along the time axis as pixel units. A real scan signal (real pixel data) is indicated by a ○. Further, assuming that the real scan signals (pixel data), as pixel units, are symmetrically arranged, horizontally and vertically, to form a matrix, a row number (horizontal line number) i and a column number j are used to represent the location of each signal. In addition, the interval between real scan signals (pixel data) that are vertically adjacent to each other is defined as a 1H period, and the interval between real scan signals (pixel data) that are horizontally adjacent to each other is defined as a 1 dot (1D) period.

When an interpolation scan signal (interpolation pixel data) is inserted between the real scan signals that are vertically adjacent, a progressive video scan signal Sout is generated.

In FIGS. 1 and 2, when, as an example, the location of an input video signal (real pixel data) Sin corresponds to the position at the intersection of the (i+3)th row and the (j+2)th column on the screen for one field, a real scan signal (real pixel data) S1, output by the delay circuit 2, is positioned at the intersection of the (i+1)th row and the (j+2)th column 2H periods above, and a real scan signal (real pixel data) S2, output by the delay circuit 3, is positioned at the intersection of the i-th row and the (j+2)th column 3H periods above.

Since the delay circuits 13 and 14 delay the input video signal Sin a 1D period, and the delay circuits 4, 5 and 6 delay the input video signal Sin a 1H period, the real scan signal (real pixel data) S3, output by the delay circuit 5, is positioned at the intersection of the (i+1)th row and the j-th column, and the real scan signal (real pixel data) S4, output by the delay circuit 6, is positioned at the intersection of the i-th row and the (j+3)th column. Further, the real scan signal (real pixel data) S5, output by the delay circuit 13, is positioned at the intersection of the (i+3)th row and the (j+1)th column.

The delay circuits 8 to 11 delay the real scan signal (real pixel data) S5 a 1H period, and the real scan signals (real pixel data) S6 to S9, output by the delay circuits 8 to 11, are positioned at the intersections of the (j+1) column and the (i+2)th row, the (i+1)th row, the i-th row and the (i−1)th row, respectively, as is shown in FIG. 2.

Since the delay circuit 7 delays the real scan signal S5 by the 2H period, the real scan signal Sn is located at the same position as the real scan signal S7. In FIG. 2, the real scan signal S7 is employed as a reference to generate an interpolation scan signal (designated by a □) S78 (Sc) that is to be inserted between the real scan signal S7 and the real scan signal S8 1H period above.

The calculator 15 calculates the difference (S5−S6) between the real scan signals S5 and S6, and the absolute value circuit 25 calculates the absolute value, |S5−S6|, of the difference (S5−S6).

The calculator 16 calculates the difference (S6−S7) between the real scan signals S6 and S7, and the absolute value circuit 26 calculates the absolute value, |S6−S7|, of the difference (S6−S7).

The calculator 17 calculates the difference (S7−S8) between the real scan signals S7 and S8, and the absolute value circuit 28 calculates absolute value, |S7−S8|, of the difference (S7−S8).

The calculator 18 calculates the difference (S8−S9) between the real scan signals S8 and S9, and the absolute value circuit 29 calculates absolute value |S8−S9| of the difference (S8−S9).

The calculator 19 calculates the difference (S6−S8) between the real scan signals S6 and S8, and the absolute value circuit 27 calculates the absolute value, |S6−S8|, of the difference (S6−S8), and transmits an absolute value signal m2 (=|S6−S8|) to the minimum value selector 31.

The calculator 20 adds the absolute value signals |S5−S6| and |S6−S7|, received from the absolute value circuits 25 and 26, and transmits the resultant signal m1 (=|S6−S6|+|S6−S7|) to the minimum value selector 31.

The calculator 21 adds the absolute value signals |S7−S8| and |S8−S9|, received from the absolute value circuits 28 and 29, and transmits the resultant signal m3 (=|S7−S8|+|S8−S9|) to the minimum value selector 31.

From among the signals m1 to m3, the minimum value selector 31 selects a minimum value signal, and outputs it as a minimum value signa M. The coefficient circuit 35 multiplies the minimum value signal M by k1 (=1/4) to generate a minimum value signal M' (=k1×M) whose level has been adjusted.

While in this embodiment, based on an experiment, the coefficient k1=1/4 is employed, the coefficient k1 may be slightly adjusted, as needed, to another constant value.

The sign generator 30 calculates the difference (S8−S6) between the real scan signals S6 and S8. When S8−S6>0, a sign signal Sp representing a positive (+) sign is output, and when S8−S6≦0, a sign signal Sp representing a negative (−) sign is output.

That is, the sign generator 30 examines the trend of the gray level change for an image by comparing the gray levels of the real scan signals S6 and S8, which are located above and below the real scan signal S7 that is used as a reference in FIG. 2. The trend of this change is represented by using the sign signal Sp.

When the sign signal Sp is positive (+), the interpolation element generator 32 outputs a positive, upper interpolation element compensation value Su (=+M') and a negative, lower interpolation element compensation value Sd (=−M'). When the sign signal Sp is negative (−), the interpolation element generator 32 outputs a negative, upper interpolation element compensation value Su (=−M') and a positive, lower interpolation element compensation value Sd (=+M').

Specifically, in the example in FIG. 2, the upper interpolation element compensation value Su of the real scan signal S7, which is used to slightly adjust the interpolation scan signal Sc (=S78), which is to be inserted between the real scan signals S7 and S8, is generated with a positive or negative sign that is provided in accordance with the gray level change trend. In addition, the lower interpolation element compensation value Sd of the real scan signal S7, which is used to slightly adjust the interpolation scan signal Sc (=S67), which is to be inserted between the real scan signals S7 and S6, is generated with a positive or negative sign being provided in accordance with the gray level change trend.

The coefficient circuit 38 receives the lower interpolation element compensation value Sd for the real scan signal (real pixel data) S7, which is delayed a 1 H period by the delay circuit 12. Thereafter, the coefficient circuit 39 receives the upper interpolation element compensation value Su for the real scan signal (real pixel data) S7.

Figure 3A:
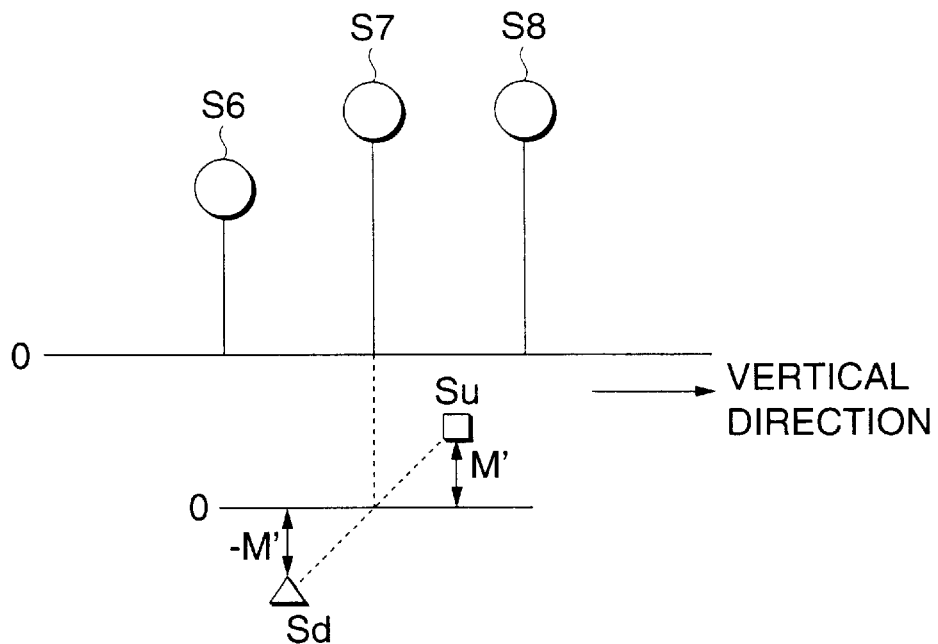
FIGS. 3A and 3B are diagrams for explaining the gray levels of an upper interpolation element compensation value and a lower interpolation element compensation value that are generated by an interpolation element generator.
Figure 3B:
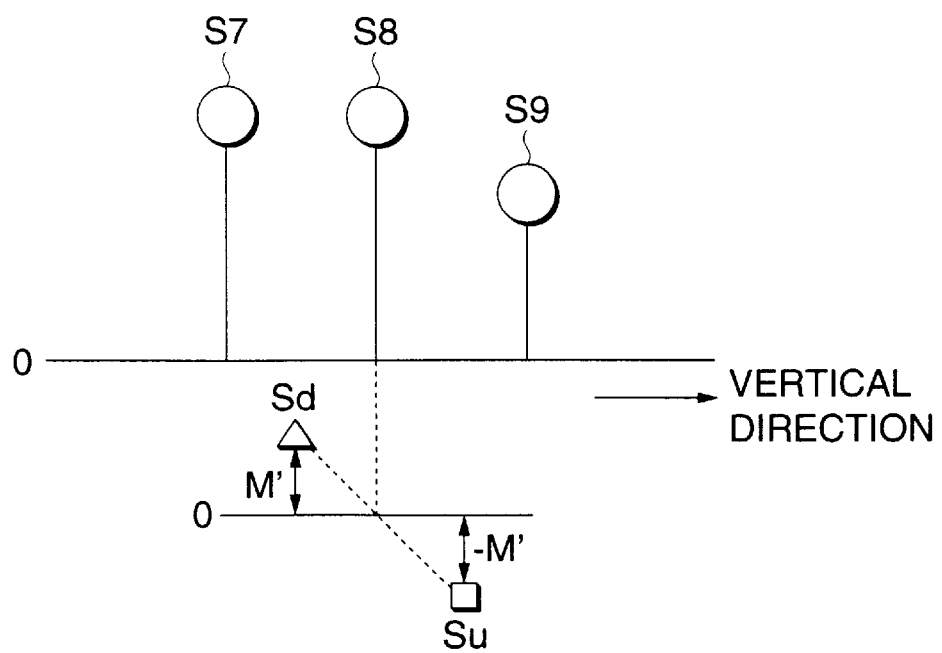

When, as is shown in FIG. 3A, it is determined for the real scan signals S6 and S8 that S6<S8, the upper interpolation element compensation value Su and the lower interpolation element compensation value Sd for the real scan signal S7 are Su=M' and Sd=−M', with 0 being used as a reference. When, as is shown in FIG. 3B, it is determined for the real scan signals S7 and S9 that S7>S9, the upper interpolation element compensation value Su and the lower interpolation element compensation value Sd for the real scan signal S8 are Su=−M' and Sd=M', with 0 being used as a reference.

The coefficient circuits 38 and 39 multiply, by coefficient G, the lower interpolation element compensation value Sd for the real scan signal S8 and the upper interpolation element compensation value Su for the real scan signal S7 to respectively obtain the first interpolation element compensation value Sdg and the second interpolation element compensation value Sug.

The coefficient G is adjusted by the detection signal CNT of the comb-toothed disturbance detector 33.

The comb-toothed disturbance detector 33 examines the following first and second conditions to determine whether there is an image having a pattern that can cause a comb-toothed disturbance, i.e., whether there are stripes, substantially horizontal, having vertical lengths that are approximately equivalent to three horizontal lines.

As the first condition, the gray levels of the real scan signals (pixel data) S6 to S9, which are vertically continuous, are examined to detect the characteristic of an image. That is, differences (S6−S7), (S8−S9) and (S7−S8) and absolute values |S6−S7|, |S8−S9| and |S7−S8| are calculated.

Figure 7A:
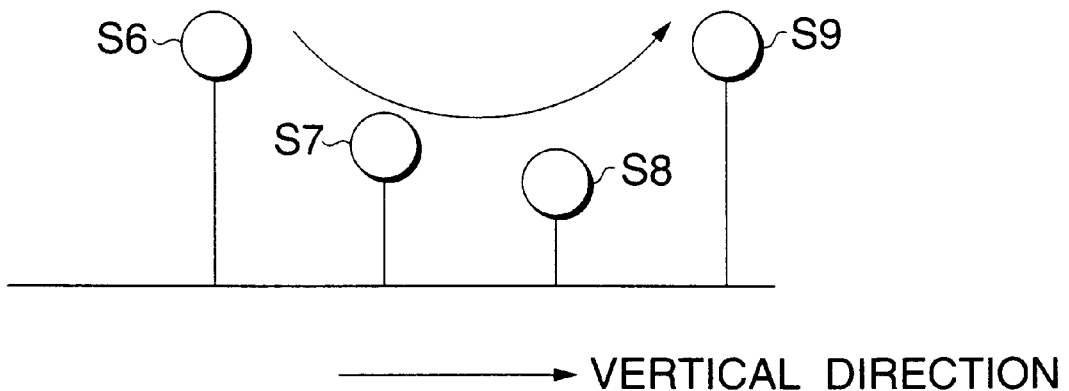
FIGS. 7A and 7B are diagrams for explaining the function of a comb-toothed disturbance detector.
Figure 7B:
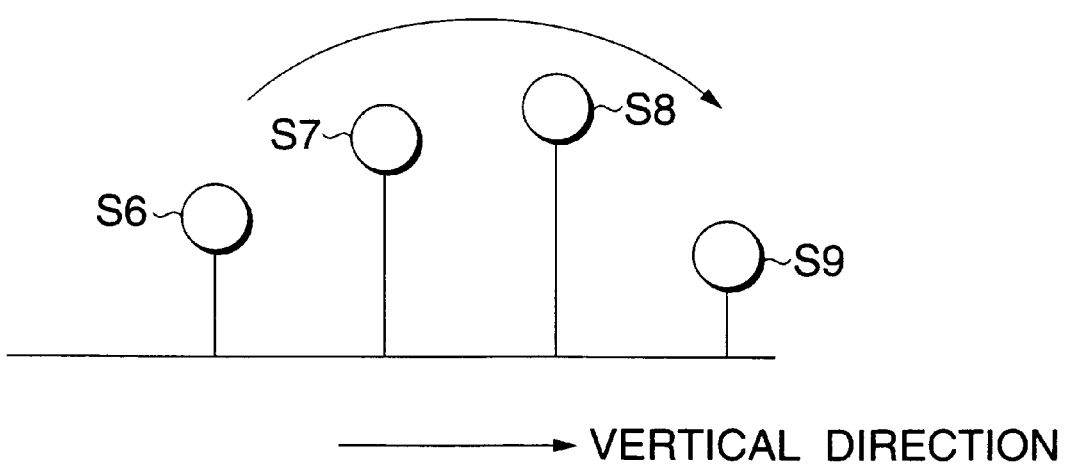

When all the conditions, such that |S6−S7|>K, |S8−S9|>K and |S7−S8|<K and that the sign (the inclination) for (S6−S7) is the opposite the sign of (S8−S9), are satisfied, it is ascertained that, as is shown in FIGS. 7A and 7B, the gray levels of the real scan signals S6 to S9 are changed.

When the difference (S6−S7)>0 and the difference (S8−S8)<0, it is ascertained that, as is shown in FIG. 7A, the gray level is changed in accordance with S6>S7≡−S8<S9. When the difference (S6−S7)<0 and the difference (S8−S8)>0, it is ascertained that, as is shown in FIG. 7B, the gray level is changed in accordance with S6<S7≡S8>S9.

When, as the result of such determinations, the gray level is changed as is shown in FIG. 7A or 7B, it is ascertained that the first condition, which constitutes a factor in the occurrence of a comb-toothed disturbance, is established.

For the second condition, the gray levels of real scan signals (real pixel data) S1 to S4, S7 and S8, which are obliquely positioned relative to the horizontal and the vertical directions, are examined to determine whether stripes that are substantially horizontal (inclination information) are present in an image. First, the differences (S8−S2) and (S3−S7) and the absolute values |S8−S2| and |S3−S7|, and the differences (S4−S8) and (S7−S1), and the absolute values |S4−S8| and |S7−S1| are calculated.

Figure 8A:
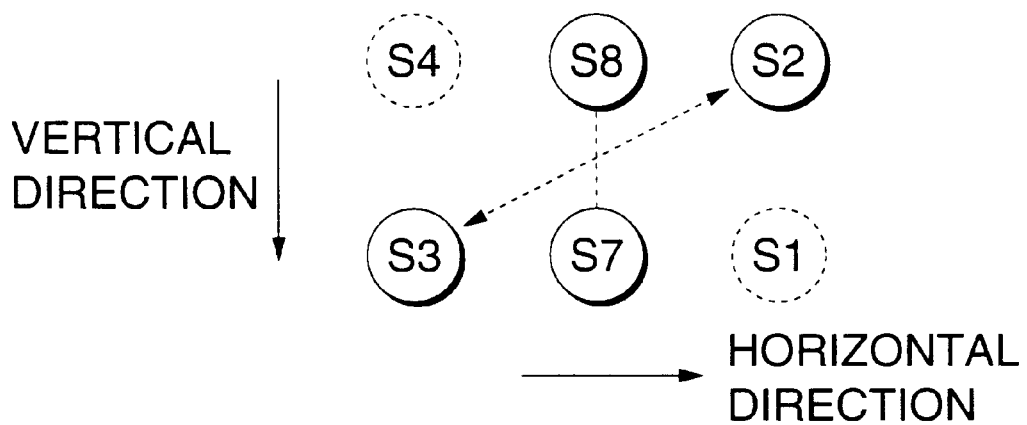
FIGS. 8A and 8B are diagrams for further explaining the function of a comb-toothed disturbance detector.

When the conditions |S8−S2|>K and |S3−S7|>K are satisfied, and when the polarity of the difference (S8−S2) is not the opposite of the polarity of the difference (S3−S8), it is ascertained that, as is shown in FIG. 8A, the inclination information is present in the directions of the real scan signals S2 and S3.

Figure 8B:
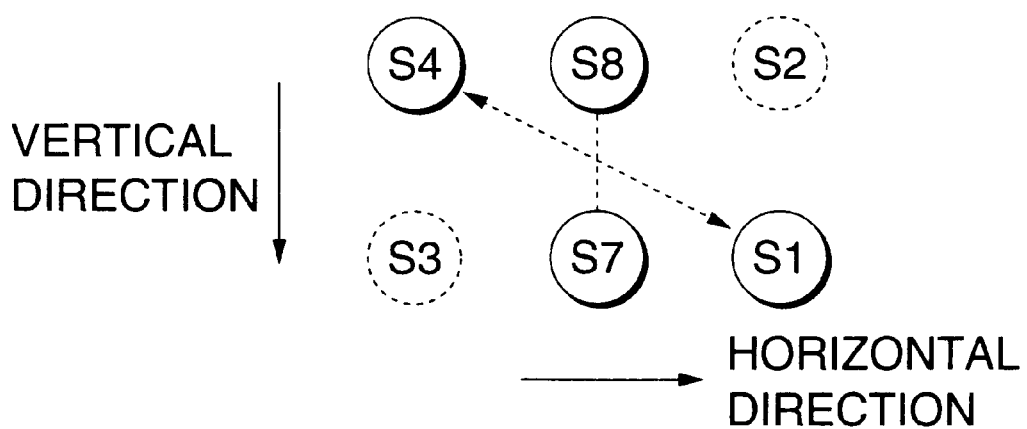

When the conditions |S4−S8|>K and |S7−S1|>K are satisfied and when the polarity of the difference (S4−S8) is not the opposite of the polarity of the difference (S7−S1), it is ascertained that, as is shown in FIG. 8B, the inclination information is present in the directions of the real scan signals S1 and S4, and in accordance with the results, it is assumed that the second condition, which is a factor in the occurrence of a comb-toothed disturbance, is established.

When the first and the second conditions are established, it is assumed that the inclination information, which is a factor in the occurrence of a comb-toothed disturbance, is included in an image that is formed by the real scan signals S1 to S4 and S7 and S8, and thus, the coefficients G of the coefficient circuits 38 and 39 are adjusted by using the detection signal CNT. That is, in response to the detection of the inclination information, as is shown in FIGS. 4A and 4B, the level of the lower interpolation element compensation value Sd for the upper real scan signal, and the level of the upper interpolation element compensation value Su for the lower real scan signal are limited to prevent the occurrence of a comb-toothed disturbance in a progressive video scan signal.

Figure 4A:
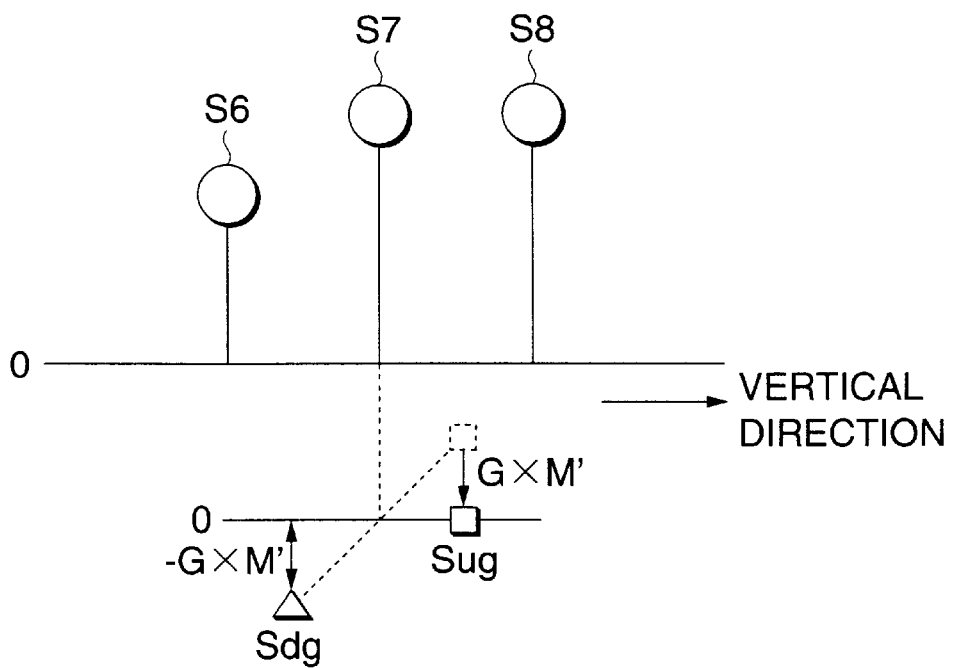
FIGS. 4A and 4B are diagrams for explaining the gray levels of an upper interpolation element compensation value and a lower interpolation element compensation value that are generated by coefficient circuits.
Figure 4B:
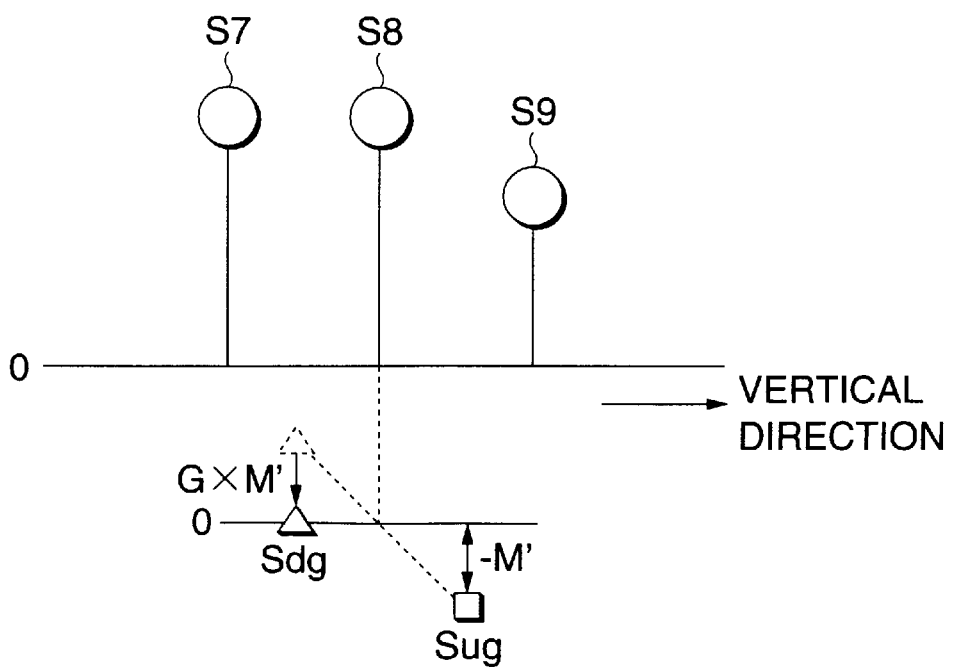
Figure 5A:
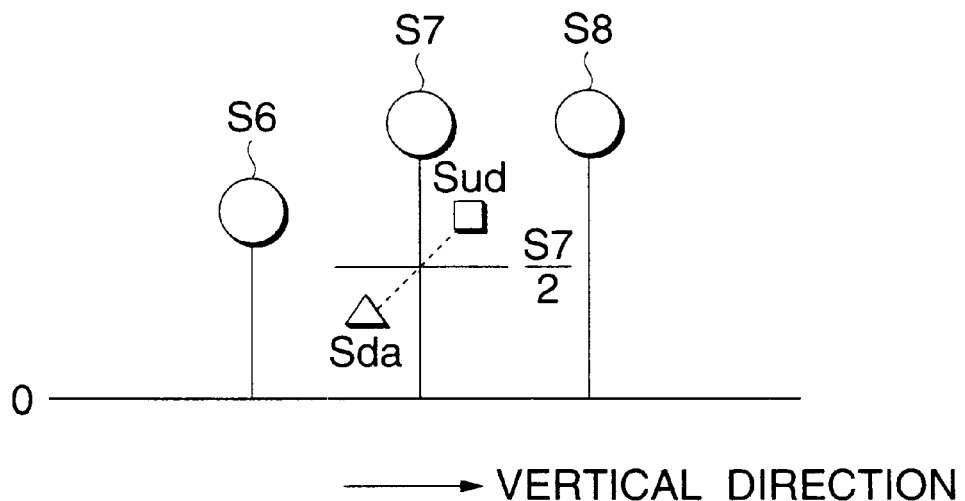
FIGS. 5A and 5B are diagrams for explaining the gray level of an interpolation element signal.
Figure 5B:
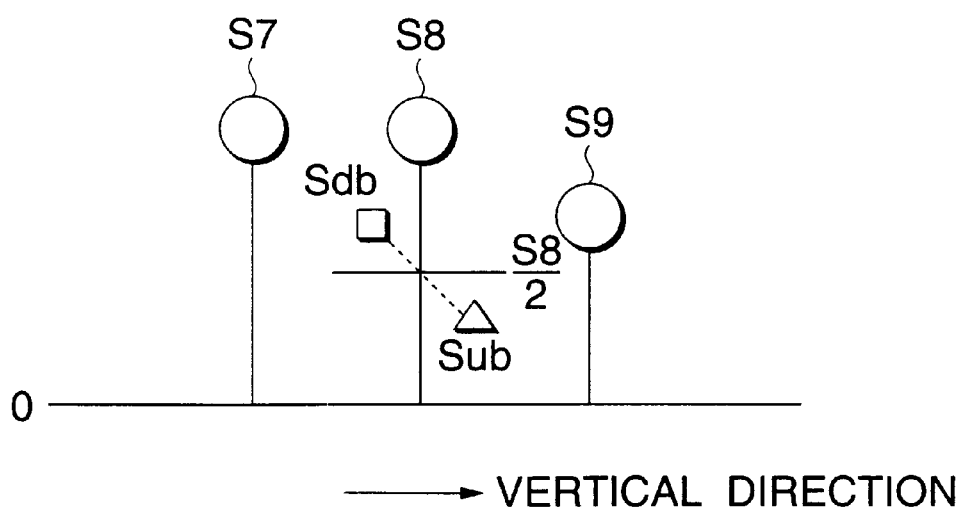

In FIGS. 4A and 4B, the coefficient value G is set to 0 when a comb-toothed disturbance occurs.

That is, the level of the first interpolation element compensation value Sdg is adjusted to Sdg =G×Sd, as is shown in FIG. 4B. And the level of the second interpolation element compensation value Sug is adjusted to Sug=G×Su, as is shown in FIG. 4A.

When, for example, the inclination information is detected, Sdg=0 and Sug=0.

The first interpolation element compensation value Sdg and the second interpolation element compensation value Sug are transmitted to the calculators 22 and 23, and are respectively added to the reference interpolation element compensation values Sg and Sa. As a result, the first and the second interpolation element signals Sdg and Sua are generated. These signals are represented by the following equations, (1-a) and (1-b).

The first interpolation element signal Sdg is $$Sdg=G\times Sdg+Sb=G\times Sdg+S8/2 \quad (1\text{-a}).$$

The second interpolation element signal Sua is $$Sua=G\times Sug+Sa=G\times Sug+S7/2 \quad (1\text{-b}).$$

Figure 6A:
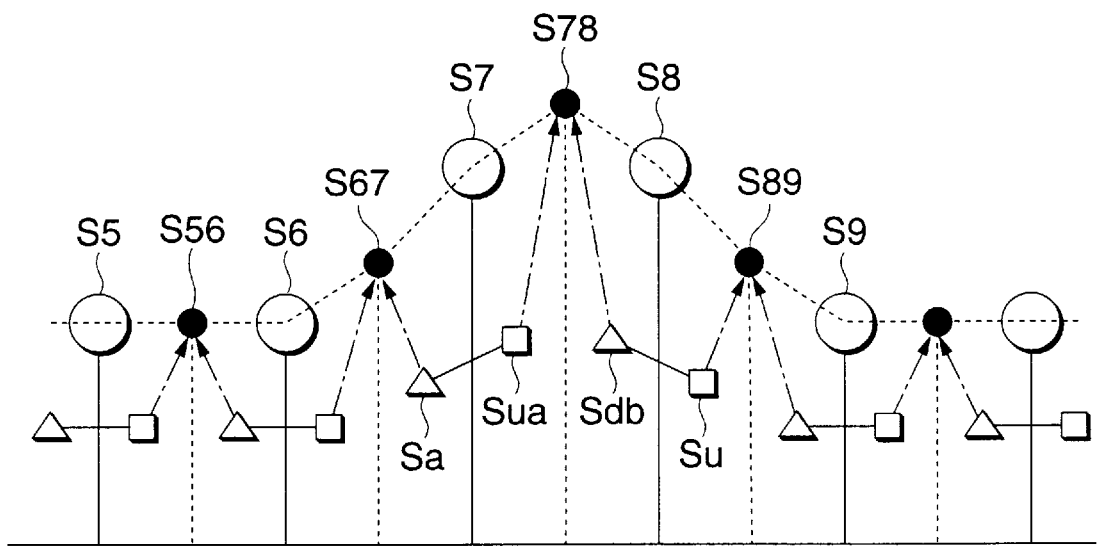
FIGS. 6A and 6B are diagrams for explaining the process for generating an interpolation scan signal.
Figure 6B:
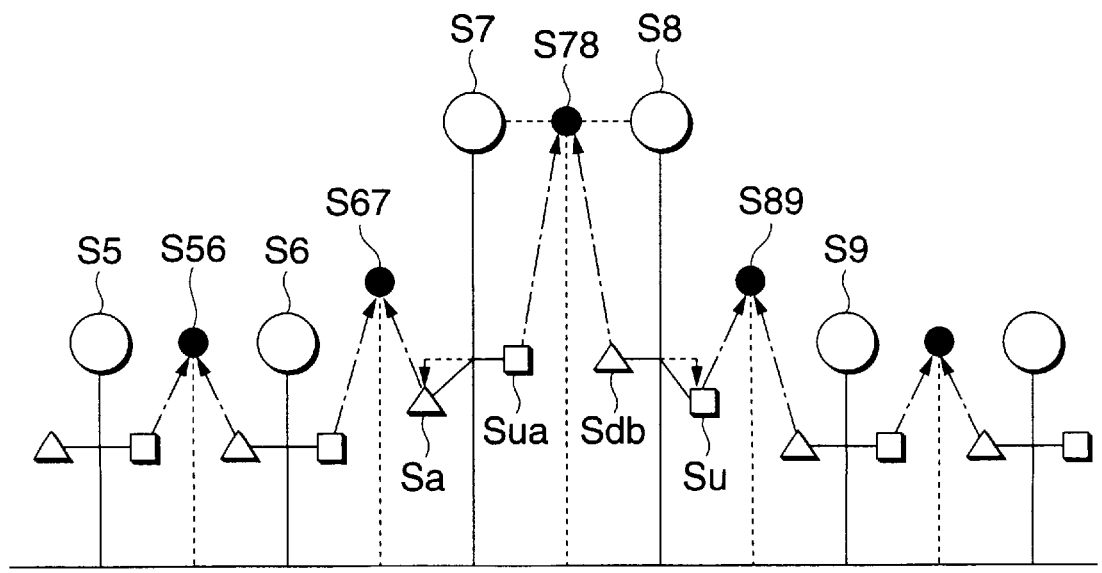

When the calculator 24 adds the first interpolation element signal Sdb (the lower interpolation element for the real scan signal S8 above the interpolation scan line) and the second interpolation element signal Sua (the upper interpolation element of the real scan signal S8 below the interpolation scan line), as is shown in FIGS. 6A and 6B, the interpolation scan signal Sc is generated and is inserted between the real scan signals S7 and S8.

That is, the interpolation scan signal Sc(=S78), to be inserted between the real scan signals S7 and S8, is generated by adding the interpolation element signal Sua (designated by a □) above the real scan signal S7 to the interpolation element signal Sdb (designated by a △) below the real scan signal S8.

Similarly, the interpolation scan signal Sc to be inserted between the vertically adjacent real scan signals is generated by adding the interpolation element signal Sua (designated by a □) above the lower real scan signal to the interpolation element signal Sdb (designated by a △) below the upper real scan signal.

The time axis converter 34 generates a progressive video scan signal Sout by inserting the interpolation scan signals Sc into the real scan signals Sn.

According to this embodiment, since the level of an interpolation scan signal that is to be inserted between real scan signals is adjusted based on the characteristic of an image, preferable image conversion can be implemented.

Figure 15:
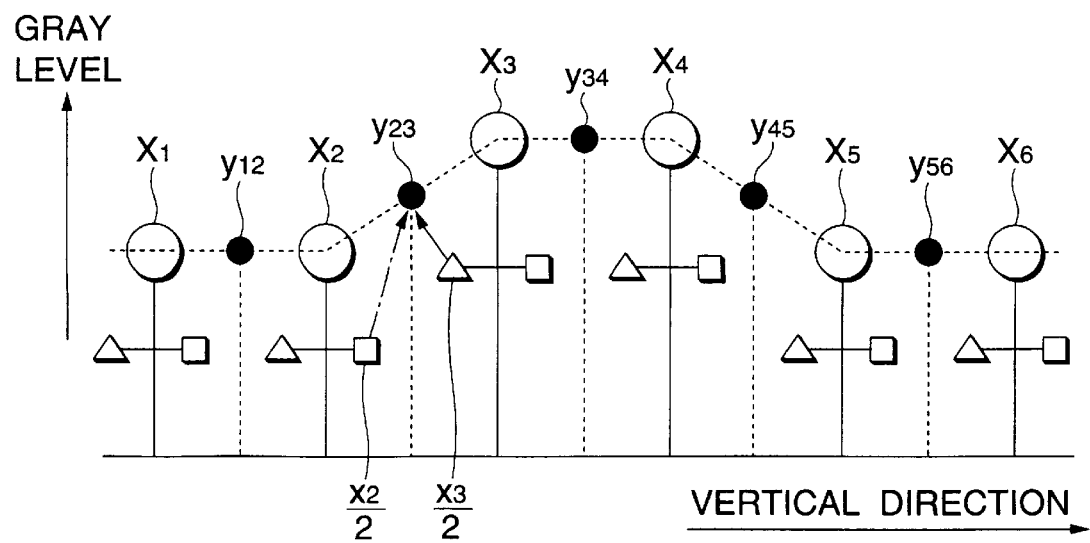
FIG. 15 is a diagram for explaining a process for generating an interpolation scan signal using a conventional average value interpolation method.

According to the conventional average value interpolation method as shown in FIG. 15, it is difficult to reproduce a peak value that is lost during the conversion of a sampled video signal into a digital signal. However, according to this embodiment, since the reproductivity of this peak value is enhanced, as shown in FIG. 6A, the peak edge contrast along the outline of an image can be clearly reproduced.

When the peak edge is reproduced, a comb-toothed disturbance occurs for an image having a specific pattern. In this case, as is shown in FIG. 6B, the upper and the lower interpolation element compensation values are limited, as is described above, to reduce the level of the peak value. Therefore, the occurrence of a comb-toothed disturbance can be suppressed.

According to the embodiment, to generate an interpolation scan signal, the upper and the lower interpolation signal elements for a specific real scan signal are calculated based on the specific real scan signal and a plurality of real scan signals that are vertically arranged in the same field. However, the method used to generate an interpolation scan signal is not limited to this example. To generate an interpolation scan signal, the upper (preceding) and the lower (succeeding) interpolation signal elements, for a specific real scan signal in a field, may be calculated based on the specific real scan signal and a plurality of real scan signals arranged along the time axis in the preceding and succeeding fields. The processes in this case can be implemented by changing the delay circuits 1 to 6 and 8 to 12 in FIG. 1 into circuits for delaying signals by one frame.

Second Embodiment

Figure 9:
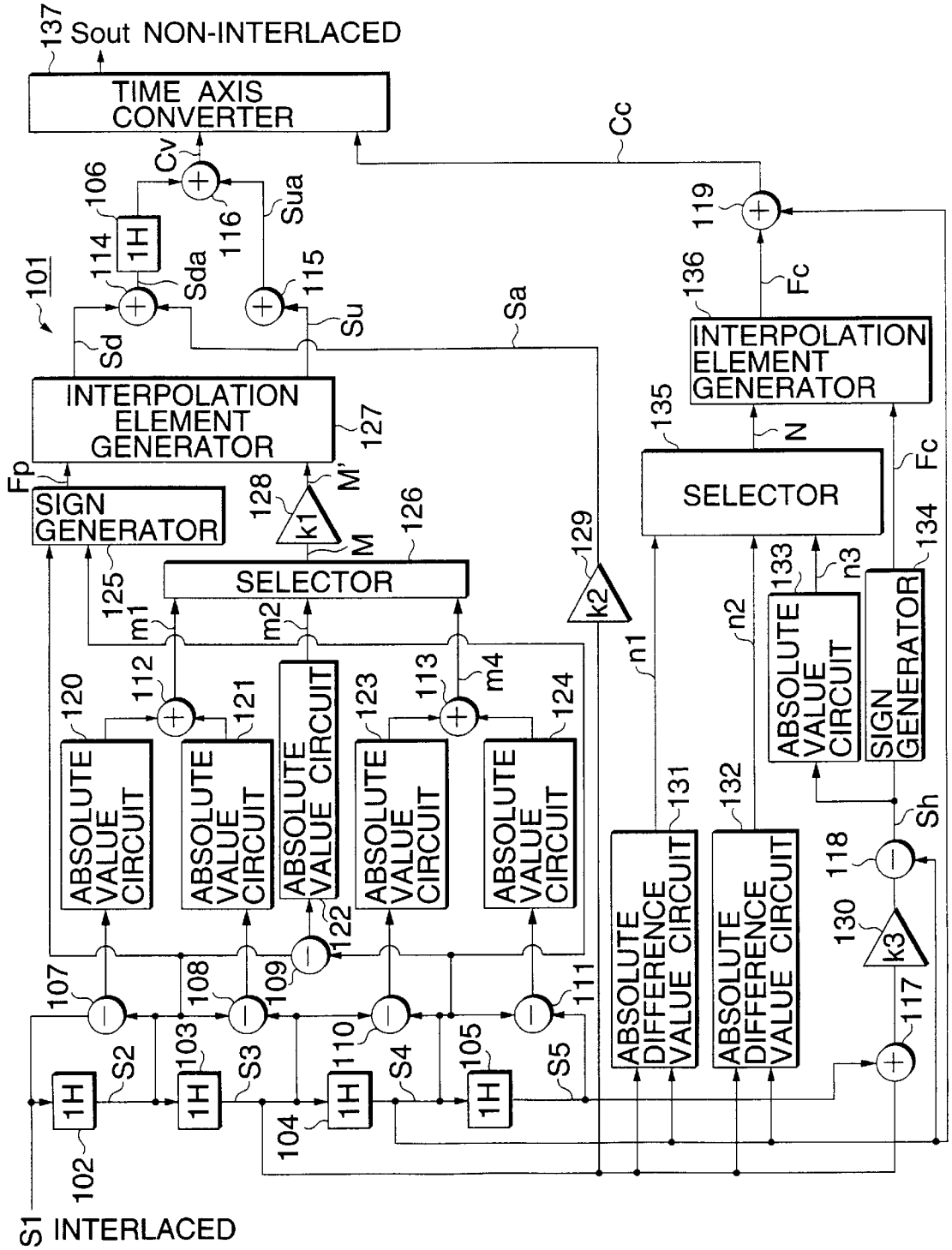
FIG. 9 is a block diagram illustrating the arrangement of a video signal conversion device according to a second embodiment of the invention.

A second embodiment of the invention will now be described while referring to the drawings. FIG. 9 is a block diagram illustrating the arrangement of a video signal conversion device according to the embodiment.

In FIG. 9, the video signal conversion device comprises: a plurality of delay circuits 102 to 106 calculators 107 to 119 and absolute value circuits 120 to 124, a first sign generator 125, a first minimum value selector 126, an interpolation element generator 127, coefficient circuits 128 to 130, absolute difference value circuits 131 and 132, a second sign generator 134, a second minimum value selector 135, a compensation element generator 136, and a time axis converter 137.

With this arrangement, the video signal conversion device converts interlaced digital video scan signal S1, which conforms, for example, to the NTSC system, into a progressive (non-interlaced) video scan signal Sout, which it then outputs. Although not shown, a plurality of the video signal conversion devices 101 in FIG. 9 are arranged in parallel in order to generate progressive video scan signals, Sout, for luminance signals Y and color difference signals $P_B$ and $P_R$.

The delay circuits 102 to 106 are constituted by FIFO (First-In First-Out) memories for delaying input signals one horizontal period (a 1H period) and for subsequently outputting the signals sequentially. Therefore, the outputs for the delay circuits 102, 103, 104 and 105, video signals (hereinafter referred to as real scan signals (pixel data)) S2, S3, S4 and S5, are delayed, following the transmission of the input video signal (pixel data) S1, a total of 1H, 2H, 3H and 4H periods, respectively. The delay circuit 106 delays the signal output by the calculator 114 a 1H period, and transmits it to the calculator 116.

Each of the calculators 107 to 111 is a subtracter for calculating a difference between two input signals, and for outputting a difference signal. That is, the calculator 107 calculates and outputs a difference between the input video signal S1 and the real scan signal S2, the calculator 108 calculates and outputs a difference between the real scan signals S2 and S3, the calculator 109 calculates and outputs a difference between the real scan signals S2 and S4, the calculator 110 calculates and outputs a difference between the real scan signals S3 and S4, and the calculator 111 calculates and outputs a difference between the real scan signals S4 and S5.

The absolute value circuits 120 to 124, which are connected to the corresponding calculators 107 to 111, calculate the absolute values of the difference signals and output the absolute value signals. The absolute value signal m2, for example, which is generated by the absolute value circuit 122, is transmitted to the first minimum value selector 126.

The calculators 112 and 113 are adders for adding together two input signals and for outputting the resultant signal. That is, the calculator 112 adds the absolute value signals that are generated by the absolute value circuits 120 and 121, and transmits the obtained signal m1 to the first minimum value selector 126. And the calculator 113 adds the absolute value signals that are generated by the absolute value circuits 123 and 124, and transmits the obtained signal m3 to the first minimum value selector 126.

The first minimum value selector 126 compares the gray levels for the signals m1 and m3 and the absolute value signal m2, and outputs the signal having the lowest gray level as the minimum value signal M.

To adjust the level of the minimum value signal M, the coefficient circuit 128 multiples the minimum value signal M by k1 and outputs the obtained minimum value signal M' $(=k1 \times M)$. The coefficient k1 has a value of 0<k1<1, and in this embodiment, its setting is a constant 1/4.

The first sign generator 125 compares the gray levels of the real scan signals S2 and S4. When it is determined that S2≦S4, a positive (+) sign signal Fp is output. And when it is determined that S2>S4, a negative (−) sign signal Fp is output.

Figure 10A:
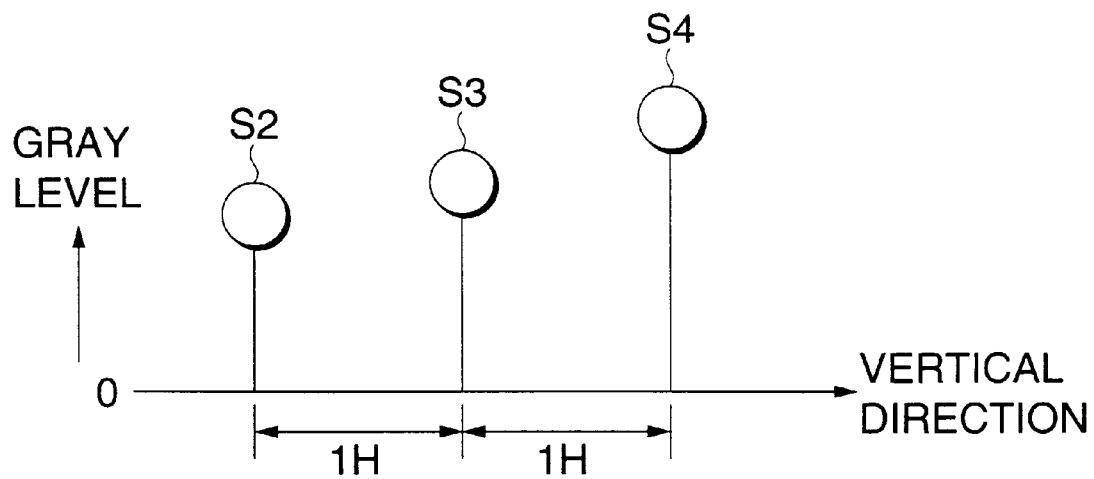
FIGS. 10A and 10B are diagrams for explaining the function of a first sign generator.
Figure 10B:
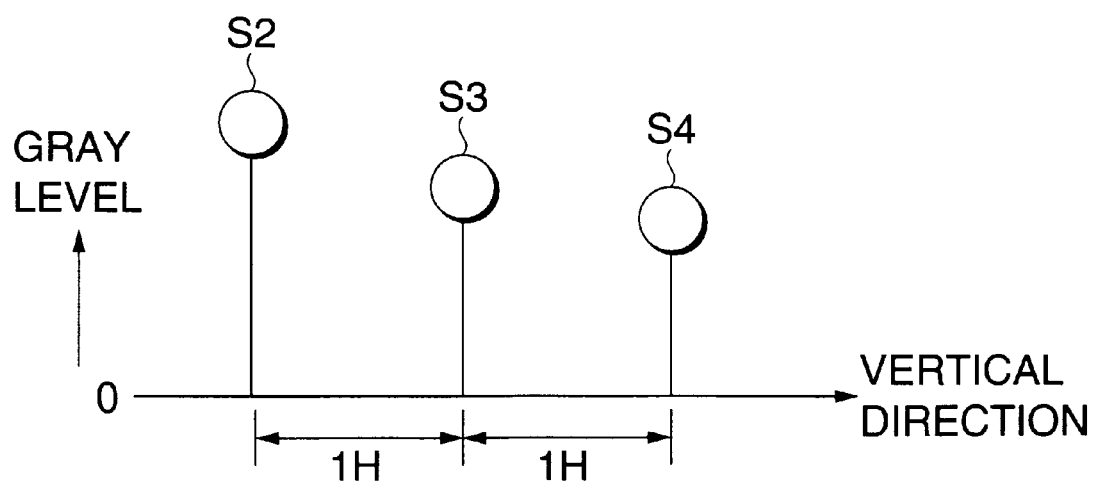

That is, as is specifically shown in FIG. 10A, when the gray level of the real scan signal S4 is higher than the gray level of the real scan signal S2, which is a 2H period later, the sign signal Fp is positive. And when, as is specifically shown in FIG. 10B, the gray level of the real scan signal S4 is lower than the gray level of the real scan signal S2, the sign signal Fp is negative.

The interpolation element generator 127 employs the minimum value signal M' and the sign signal Fp to generate, for pixel data S3, an upper interpolation element compensation value Su and a lower interpolation element compensation value Sd, and outputs these values.

Specifically, when the sign signal Fp is positive (+), the positive, upper interpolation element compensation value Su (=M') and the negative, lower interpolation element compensation value Sd (=−M') are generated. Therefore, when the sign signal Fp is positive (+), the signals Su and Sd are represented by the following equations (2-a) and (2-b).

$$Su=M'=k1 \times M \quad (2\text{-a})$$

$$Sd=-M'=-k1 \times M \quad (2\text{-b})$$

When the sign signal Fp is negative (−), the negative, upper interpolation element compensation value Su (=−M') and the positive, lower interpolation element compensation value Sd (=M') are generated. Therefore, the signals Su and Sd are represented by the following equations (3-a) and (3-b).

$$Su=-M'=-k1 \times M \quad (3\text{-a})$$

$$Sd=M'=k1 \times M \quad (3\text{-b})$$

For each pixel, the coefficient circuit 129 receives the real scan signal (pixel data) S3 from the delay circuit 103, multiplies the real scan signal S3 by k2, to adjust its level, and outputs the reference interpolation element value Sa (=K2×S3). in this embodiment, the setting for the coefficient k2is 1/2, and the gray level for the reference interpolation element value Sa is 1/2 the real scan signal s3.

The calculators 114 and 115 are adders. The calculator 114 adds the reference interpolation element value Sa to the lower interpolation element signal Sd, and outputs to the delay circuit 106 the obtained first interpolation element signal Sda (=Sa+Sd). The delay circuit 106 transmits to the calculator 116, which is also an adder, the first interpolation element signal Sda, which is 1H period earlier, i.e., the lower interpolation element signal of the real scan signal S4. The calculator 115 adds the reference interpolation element value Sa to the upper interpolation element compensation value Su, and transmits the obtained second interpolation element signal Sua (=Sa+Su), i.e., the upper interpolation element signal of the real scan signal S3, direct ly to the calculator 116.

Therefore, the first interpolation element signal Sda and the second interpolation element signal Sua are represented by the following equations (4-a) and (4-b).

$$Sda=Sa+Sd \quad (4\text{-a})$$

$$Sua=Sa+Su \quad (4\text{-b})$$

Figure 11A:
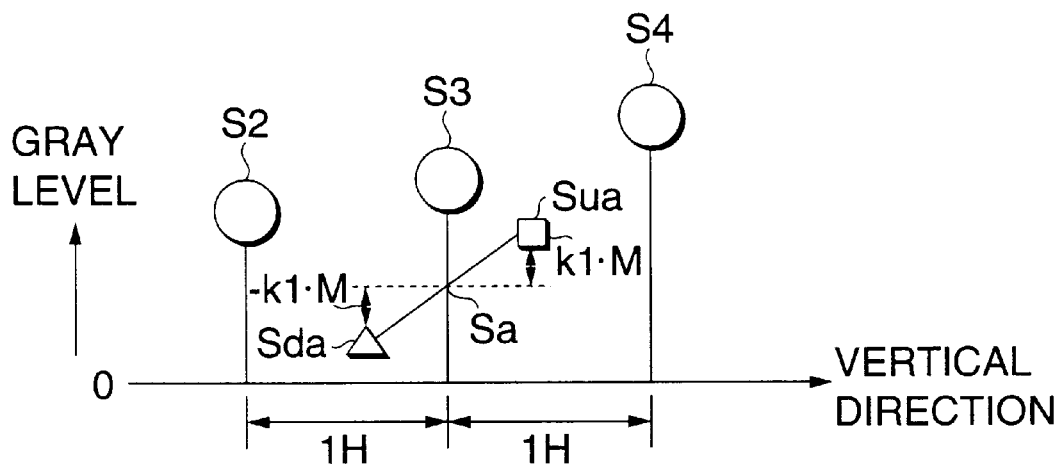
FIGS. 11A and 11B are diagrams for representing the gray levels of a first interpolation element signal and a second interpolation element signal.

When the sign signal Fp is positive (+), as is indicated by a Δ in FIG. 11A, the first interpolation element signal Sda has a value that is −k1×M smaller than the reference interpolation element signal Sa, and as is indicated by a □, the second interpolation element signal Sua has a value that is k1×M greater than the reference interpolation element signal Sa.

Figure 11B:
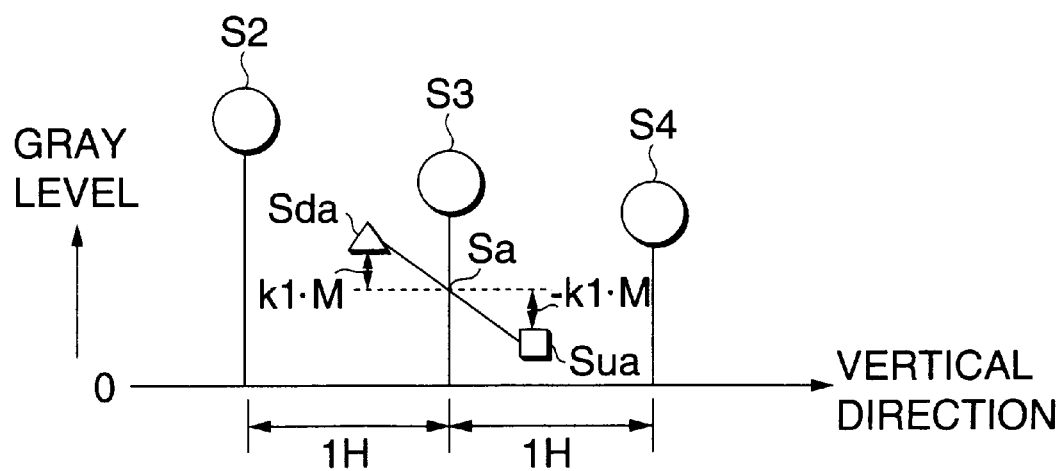

When the sign signal Fp is negative (−), as is indicated by a Δ in FIG. 11B, the first interpolation element signal Sda has a value that is k1×M greater than the reference interpolation element signal Sa, and as is indicated by a □, the second interpolation element signal Sua has a value that is −k1×M smaller than the reference interpolation element signal Sa.

As is described above, the first and the second interpolation element signals Sda and Sua are set to values that are consonant with the trend in the change in the gray levels of the real scan signals (real pixel data) S2 and S4, which are positioned above and below the real scan signal (real pixel data) S3.

When the first and the second interpolation element signals Sda and Sua are added together by the adder 116, an interpolation scan signal (compensation pixel data) Cv is generated for insertion between the real scan signals (real pixel data) that are vertically continued in the current field, and is transmitted to the time axis converter 137.

As is shown in FIG. 9, the first interpolation element signal Sda is delayed a 1H period by the delay circuit 106, and is added to the second interpolation element signal Sua by the calculator 116. Therefore, when the second interpolation element signal (upper interpolation element signal of the pixel data S3) Sua, which has currently been generated, is added to the first interpolation element signal (lower interpolation element signal of the pixel data S4) Sda, which was generated 1H period before, an interpolation scan signal (interpolation pixel data) Cv is generated for insertion between the real scan signals (real pixel data) S3 and S4.

The absolute difference value circuits 131 and 132 are constituted by a subtracter for calculating a difference between two input signals and an absolute value circuit for calculating the absolute value of the difference signal generated by the subtracter. The absolute difference value circuit 131 obtains an absolute value, |S4−S3|, as the difference between the real scan signals (real pixel data) S3 and S4, and transmits an absolute value signal n1 to the second minimum value selector 135. The absolute difference value circuit 132 obtains an absolute value, |S5−S4|, for the difference between the real scan signals (real pixel data) S5 and S4, and transmits an absolute value signal n2 to the second minimum value selector 135.

The calculators 117 and 118 are an adder and a subtracter, and a predetermined constant coefficient k3 is set in advance for the coefficient circuit 130. In this embodiment, the setting for the coefficient k3 is a constant 1/2.

The calculator 117 adds together the real scan signals (real pixel data) S3 and S5, the coefficient circuit 130 multiples the obtained signal (S3+S5) by k3 and outputs the resultant signal, and the calculator 116 subtracts the real scan signal (real pixel data) S4 from the output of the coefficient circuit 130. As a result, an adjusted element signal Sh is generated. This signal Sh is represented by the following equation (5).

$$Sh = k3 \times (S3+S5) - S4 \quad (5)$$

The absolute value circuit 33 calculates the absolute value, |Sh|, of the adjusted element signal Sh, and transmits the obtained absolute value signal n3 to the second minimum value selector 135.

The sign generator 134 examines the polarity of the adjusted element signal Sh. When a value of Sh≦0 is established, a sign signal Fc, representing a positive (+) sign, is output to the compensation element generator 136. When a value of Sh<0 is established, a sign signal Fc, representing a negative (−) sign, is output to the compensation element generator 136.

Figure 12A:
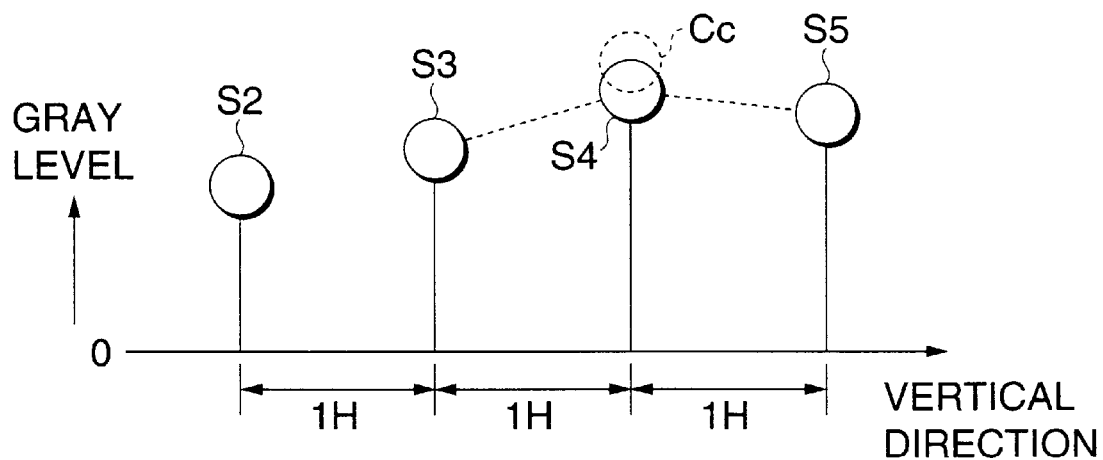
FIGS. 12A and 12B are diagrams for explaining the function of a second sign generator.

Specifically, when among the real scan signals (real pixel data) S3, S4 and S5, which are located along the three vertically continuous real scan lines, the gray level of the real scan signal S4 is changed so it is higher than those of the real scan signals S3 and S5, as is shown in FIG. 12A, the adjusted element signal Sh, in accordance with the equation (5), is equal to or greater than 0. Therefore, the positive edge of the real scan signal S4, relative to the real scan signals S3 and S5, is detected, and in this case, the sign signal Fc indicates a positive value.

Figure 12B:
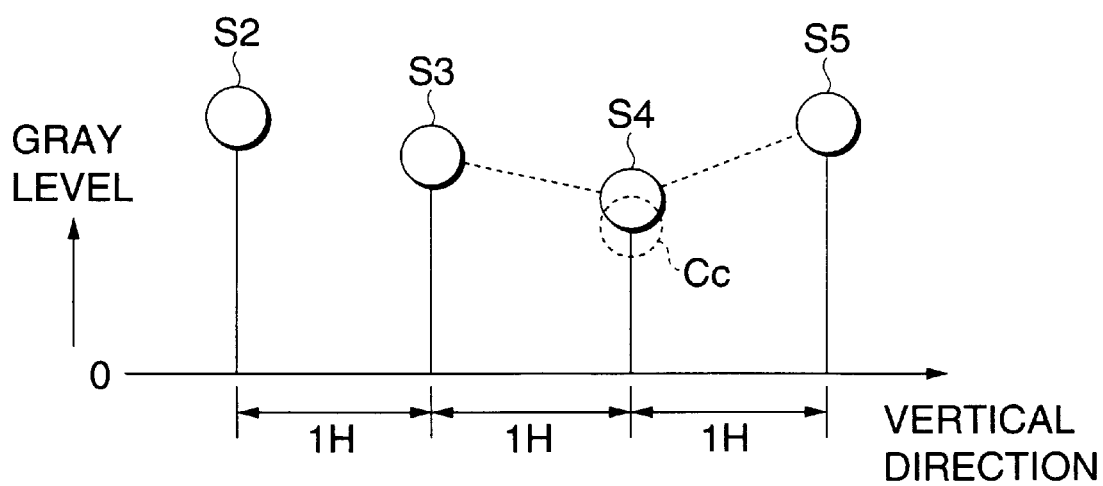

When among the real scan signals (real pixel data) S3, S4 and S5, which are located along the three vertically continuous real scan lines, the gray level of the real scan signal S4 is changed so it is lower than those of the real scan signals S3 and S5, as is shown in FIG. 12B, the adjusted element signal Sh, in accordance with the equation (5), is smaller than 0. Therefore, the negative edge of the real scan signal S4, relative to the real scan signals S3 and S5, is detected, and in this case, the sign signal Fc indicates a negative value.

The second minimum value selector 135 compares the absolute value signals n1 to n3, and outputs the smallest signal as a minimum value signal N.

The compensation element generator 136, uses the minimum value signal N and the sign signal Fc to generate the compensation element signal Sc, which it thereafter outputs. That is, when the sign signal Fc indicates a negative value, the compensation element signal Sc=−N, and when the sign signal Fc indicates a positive value, the compensation element signal Sc=N.

The calculator 119 adds (mixes together) the compensation element signal Sc and the real scan signal S4, which is received from the delay circuit 104, and transmits the result to the time axis converter 137 as a compensation signal Cc. That is, when the sign signal Fc is negative, the compensation signal Cc=−N+S4, and when the sign signal Fc is positive, the compensation signal Cc=N+S4.

More specifically, when, as is shown in FIG. 12A, the gray level of the real scan signal S4 is changed so that it is higher than the levels of the real scan signals S3 and S5, as is indicated by a broken-line ○, the gray level of the compensation signal Cc is corrected, so that in accordance with the relationship Cc=N+S4, it is higher than the real scan signal S4.

Further, when, as is shown in FIG. 12B, the gray level of the real scan signal S4 is changed so that it is lower than the levels of the real scan signals S3 and S5, as is indicated by a broken-line ○, the gray level of the compensation signal Cc is corrected, so that in accordance with the relationship Cc=−N+S4, it is lower than the real scan signal S4.

The time axis converter 137 alternately inserts the interpolation scan signal Cv and the compensation signal Cc to convert a real, interlaced scan signal into a progressive video scan signal Sout. Therefore, the real scan signal S4 is replaced by the compensation signal Cc, which together with the interpolation scan signal Cv is then inserted, in the original real scan line, as a real scan signal.

Figure 13:
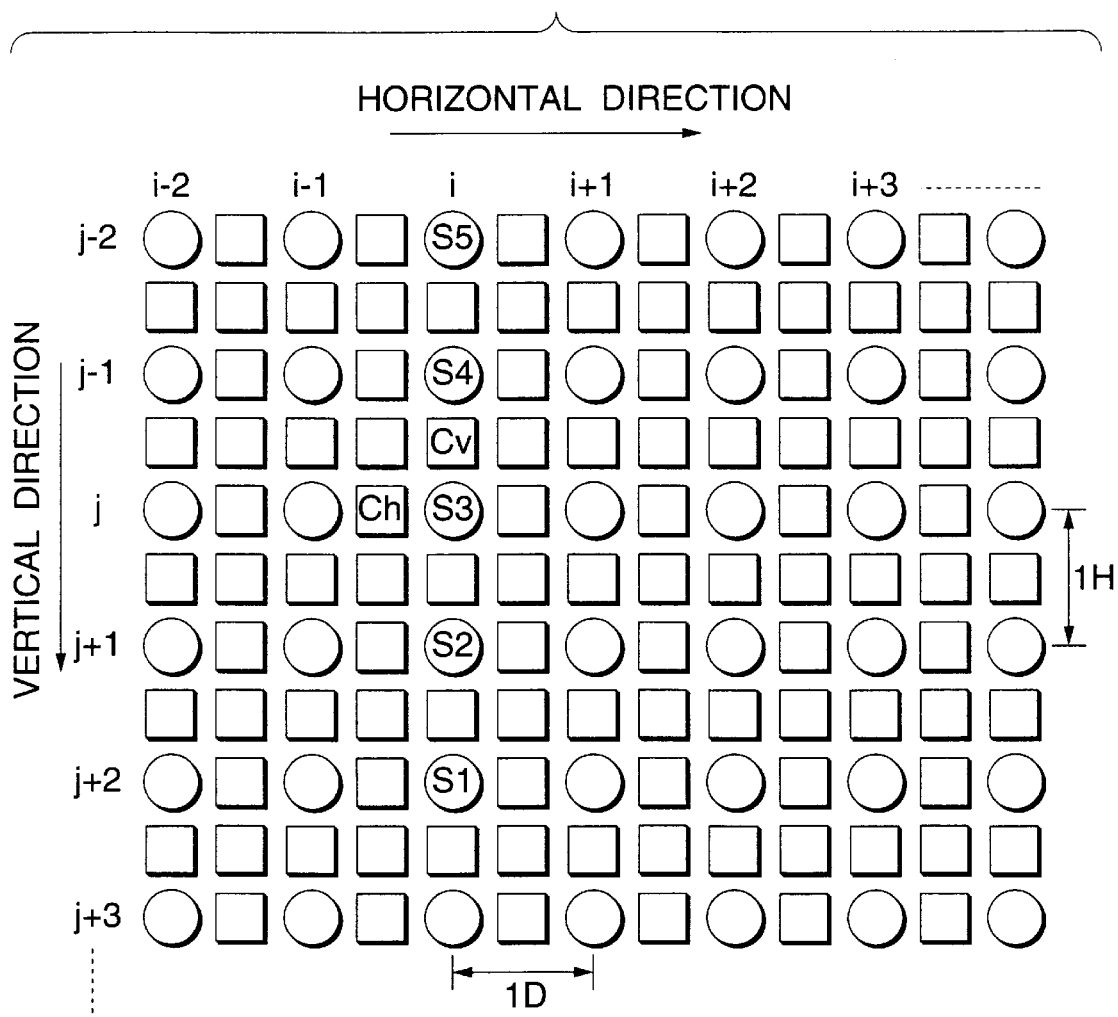
FIG. 13 is a diagram for explaining a spatial arrangement of real scan signals and interpolation scan signals along a time axis.

The processing performed by the thus arranged video signal conversion device 101 will now be described while referring to FIGS. 13 and 14. FIG. 13 is a diagram for explaining an example spatial arrangement of video signals (real scan signals) for individual pixels in a current field. A real scan signal is indicated by a ○, and an interpolation scan signal is indicated by a Δ. The real scan signals for individual pixels are arranged as a matrix in the horizontal and the vertical directions, and each location is represented by a column number i and a row number j. The interval between the vertically adjacent real scan signals is a 1H period, and the interval between the horizontally adjacent real scan signals is a one-dot (1D) period.

In FIG. 13, assuming that the real scan signal S3 is located at the intersection of the i-th column and the j-th row, the other real scan signals S1, S2, S4 and S5 are located by shifting up a 1H period along the i column.

As is explained while referring to FIGS. 10A, 10B, 11A and 11B, the interpolation scan signal Cv, which is to be inserted between the real scan signals S3 and S4, is generated by adding together the first and the second interpolation element signals Sda and Sua, and is inserted into the pertinent position by the time-axis converter 137.

Figure 14:
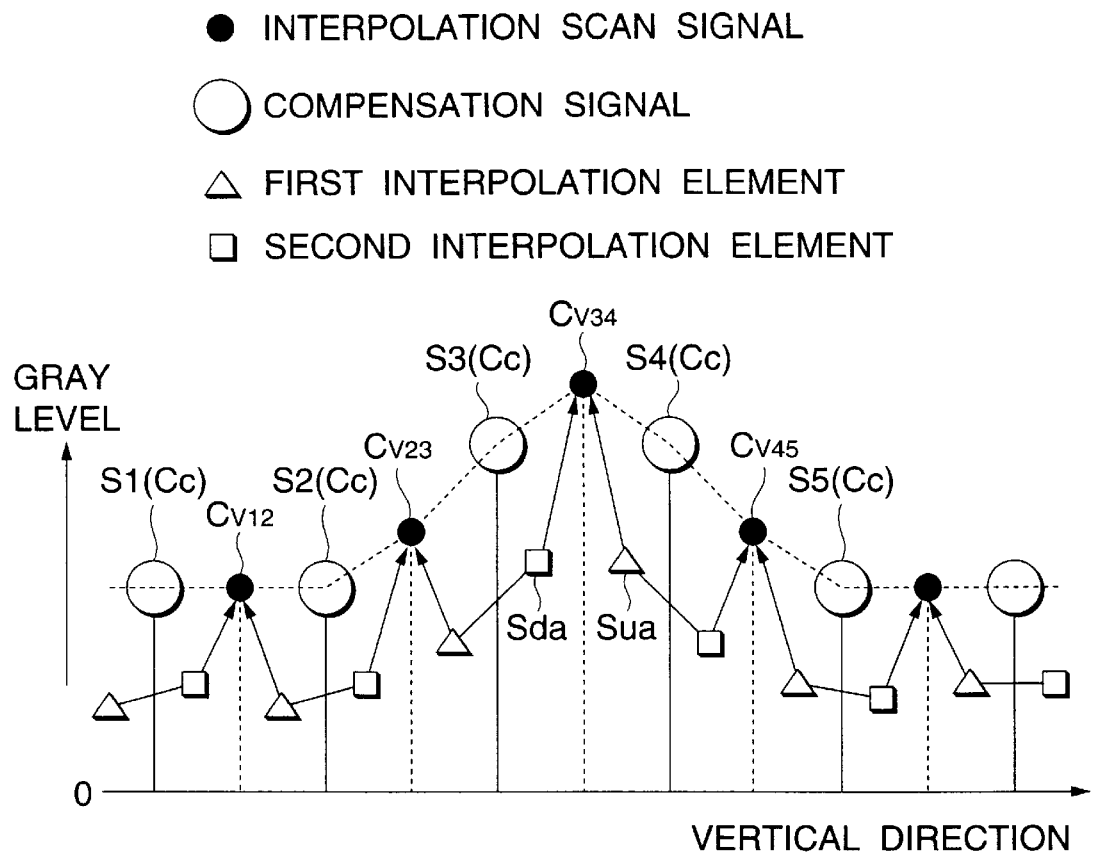
FIG. 14 is a diagram for explaining an insertion process for the vertical direction.

Specifically, as is shown in FIG. 14, when the calculator 116 adds the second interpolation element signal (the upper interpolation element signal for the pixel data S3) Sua, which is generated by using the real scan signal S3 as a reference, to the first interpolation element signal (the lower interpolation element signal of the pixel data S4) Sda, which is generated by using as a reference the real scan signal S4 located a 1H period before, the interpolation scan signal Cv is generated. This interpolation scan signal Cv serves as an interpolation scan signal Cv34, which is indicated by a ● in FIG. 14. The other interpolation scan signals, Cv12, Cv23, Cv45, . . . , are obtained in the same manner.

Furthermore, the calculator 119 generates a compensation signal Cc by adding the real scan signal S4 to the compensation element signal Sc, which is output by the compensation element generator 136, and the time axis converter 137 replaces the real scan signal S4 with the compensation signal Cc. That is, the real scan signals S1, S2, S4, S5, . . . , indicated by a ○ in FIG. 14, are converted into the compensation signals Cc, whose gray levels are adjusted, and are then arranged so they occupy the positions of the original real scan signals.

Since the above described processing is sequentially performed for the interlaced video scan signals, the interlaced video scan signals are changed to progressive video scan signals.

In the above embodiment, the number of pixel data sets (scan lines) is doubled in the vertical direction. However, the number of pixel data sets may also be doubled in the horizontal direction. In this case, the 1H delay circuits 102 to 106 in FIG. 9 may delay the signals 1D periods, and the calculators 107 to 116, the absolute value circuits 120 to 124, the sign generator 125, the minimum value selector 126 and the coefficient circuit 128 may be connected in the same manner as in FIG. 9. With this arrangement, the interpolation scan signal Cv in FIG. 9 is generated as horizontal interpolation pixel data Ch, which are to be inserted between the adjacent pixel data distributed along the same scan line.

According to the conventional average value interpolation method, as is shown in FIG. 15 it is difficult to reproduce a peak value that is lost during the conversion of a sampled video signal into a digital signal. However, according to this embodiment, the reproductivity of this peak value can be enhanced, as is indicated by a ● in FIG. 14, and the peak edge contrast along the outline of an image can be clearly reproduced.

When the above interpolation process is performed for a striped image having a three line size in the vertical direction and a three dot size in the horizontal direction, and the peak and the edge are reproduced, a comb-toothed (zigzag) disturbance occurs and causes image deterioration. In this embodiment, however, since to cancel the disturbance the compensation value is added to the real pixel data, as is indicated by a ○ in FIG. 14, the gray level is smoothly changed between the real scan signal and the interpolation scan signal, and an image having a high quality can be obtained.

As is described above, according to the line interpolation apparatus of the invention, the lower and upper interpolation elements are generated by the lower interpolation element generation means and the upper interpolation element generation means. The levels of the lower and upper interpolation elements are adjusted in accordance with the inclination information for an image that is detected by the inclination detection means. The first and the second interpolation elements that are obtained by the level adjustment are added together to generate an interpolation scan signal. The interpolation scan signal is then inserted into the interpolation scan line. Therefore, an interpolation scan signal consonant with the characteristic of the image can be generated, and image conversion can be performed to obtain a preferable image quality.

In particular, the peak value of a video signal that is lost during digital sampling can be reproduced, and an image can be reproduced with an appropriate peak edge contrast, while the occurrence of a comb-toothed disturbance is suppressed.

As is described above, according to the video signal conversion device of the invention, pixel data for a first pixel, which is vertically (or horizontally) adjacent to one side of an interpolation pixel, and pixel data for a plurality of pixels, which are vertically (or horizontally) contiguous with the first pixel, are employed to generate an interpolation element for the first pixel positioned beside the interpolation pixel. Further, the pixel data for a second pixel, which is vertically (or horizontally) adjacent to the other side of an interpolation pixel, and pixel data for a plurality of pixels, which are vertically (or horizontally) contiguous with the second pixel, are employed to generate an interpolation element for the second pixel positioned beside the interpolation pixel. Then, the first interpolation element is added to the second interpolation element to generate interpolation pixel data for the interpolation pixel. Following this, a compensation value is generated based on the pixel data for the first or the second pixel and the pixel data for the pixels that are vertically (or horizontally) contiguous with the relevant pixel. The compensation value is then mixed with the pixel data for the first or the second pixel to compensate the pixel data. Therefore, the reproductivity of the peak value for the interpolation pixel can be enhanced, and the edge contrast along the outline of an image can be clearly reproduced. In addition, the comb-toothed disturbance can be eliminated, and the gray level can be smoothly changed between the real scan signal and the interpolation scan signal. As a result, an image having a high quality can be obtained.

What is claimed is:

1. A line interpolation apparatus for converting a video signal for interlaced scanning into a video signal for progressive scanning, the line interpolation apparatus comprising:

lower interpolation element generation means for employing an upper real scan signal, along a real scan line that is above and adjacent to an interpolated scan line, and real scan signals, along a plurality of sequential real scan lines that are vertical relative to the upper real scan line, to generate a lower interpolation element for the upper real scan signal;

upper interpolation element generation means for employing a lower real scan signal, along a lower real scan line that is below and adjacent to the interpolated scan line, and real scan signals, along a plurality of sequential real scan lines that are vertical to the lower real scan line, to generate an upper interpolation element for the lower real scan signal;

inclination detection means for detecting inclination information for an image based on two or more real scan signals, including the upper and the lower real scan signals;

limitation means for adjusting levels of the upper interpolation element and the lower interpolation element in accordance with the inclination information detected by the inclination detection means, and for generating a first interpolation element and a second interpolation element whose levels are adjusted; and addition means for adding the first and the second interpolation elements to generate an interpolated scan signal that is to be inserted into the interpolated scan lines that are adjacent to the upper and the lower real scan lines.

2. The line interpolation apparatus according to claim 1, wherein the lower interpolation element generation means generates a lower compensated value based on the upper real scan signal and a plurality of real scan signals that are vertical thereto, sets the sign of the lower compensated value by comparing values of a pair of vertical real scan signals that are adjacent to the upper real scan signal, and generates the lower interpolation element by adding the lower compensated value to 1/2 of the value of the upper real scan signal; and wherein the upper interpolation element generation means generates an upper compensated value based on the lower real scan signal and a plurality of real scan signals that are vertical thereto, sets the sign of the upper compensated value by comparing values of a pair of real scan signals that are vertically adjacent to the lower real scan signal, and generates the lower interpolation element by adding the upper compensated value to 1/2 of the value of the lower real scan signal.

3. A video signal conversion device comprising:

first interpolation element generation means for employing pixel data for a first pixel, which is vertically or horizontally adjacent to one side of an interpolation pixel, and pixel data for a plurality of pixels, which are vertically or horizontally contiguous with the first pixel, to generate an interpolation element for the first pixel positioned beside the interpolation pixel;

second interpolation element generation means for employing pixel data for a second pixel, which is vertically or horizontally adjacent to the other side of the interpolation pixel, and pixel data for a plurality of pixels, which are vertically or horizontally contiguous with the second pixel, to generate an interpolation element for the second pixel positioned beside the interpolation pixel;

addition means for adding together the first interpolation element and the second interpolation element to generate interpolation pixel data for the interpolation pixel; and compensation means for generating a compensation value based on the pixel data for the first or the second pixel and the pixel data for the plurality of pixels that are vertically or horizontally contiguous with the relevant pixel, and for mixing the compensation value with the pixel data for the first or the second pixel.

4. A video signal conversion device according to claim 3, wherein the first interpolation element generation means employs the pixel data for the first pixel and the pixel data for the plurality of pixels that are vertically or horizontally contiguous with the first pixel to generate a compensation value for the first pixel positioned beside the interpolation pixel, compares pixel data for a pair of pixels that are vertically or horizontally adjacent to the first pixel in order to designate a sign for the compensation value for the first pixel positioned beside the interpolation pixel, and, to generate the first interpolation element, adds the obtained compensation value to 1/2 of the pixel data for the first pixel; and wherein the second interpolation element generation means employs the pixel data for the second pixel and the pixel data for the plurality of pixels that are vertically or horizontally contiguous with the second pixel to generate a compensation value for the second pixel positioned beside the interpolation pixel, compares pixel data for a pair of pixels that are vertically or horizontally adjacent to the second pixel to designate a sign for the compensation value for the second pixel positioned beside the interpolation pixel, and, to generate the second interpolation element, adds the obtained compensation value to 1/2 of the pixel data for the second pixel.

* * * * *